Sept. 30, 1958
J. L. PATTON
2,854,319
HYDROCARBON CONVERSION SYSTEM
Filed Oct. 12, 1954
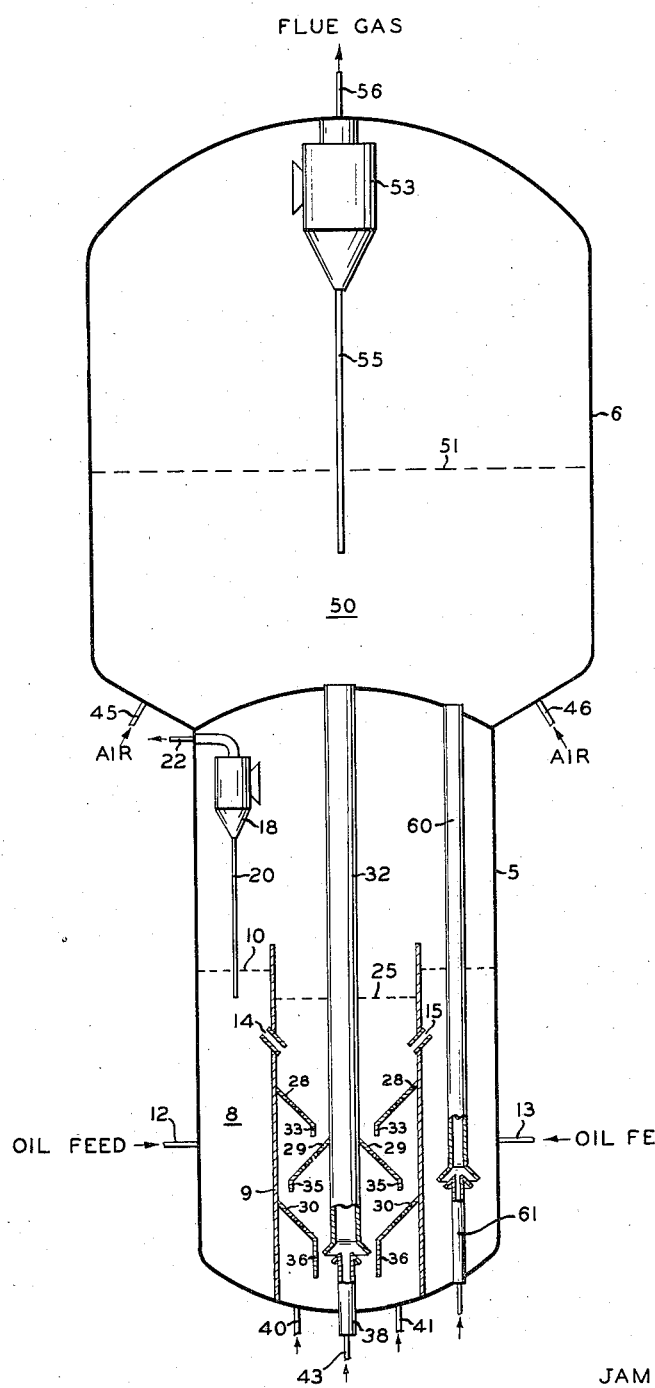
INVENTOR.
JAMES L. PATTON
BY G. H. Palmer
J. E. Virgil
ATTORNEYS United States Patent Office 2,854,319
Patented Sept. 30, 1958

2,854,319

HYDROCARBON CONVERSION SYSTEM

James L. Patton, Ramsey, N. J., assignor to The M. W. Kellogg Company, Jersey City, N. J., a corporation of Delaware Application October 12, 1954, Serial No. 461,777

5 Claims. (Cl. 23—288)

This invention relates to improved means for contacting subdivided solid material with gasiform material and more particularly it pertains to improved stripping means for the removal of volatile hydrocarbons occluded with and/or adsorbed on finely divided catalytic material which has been used for the conversion of hydrocarbons.

In the design of a system for the conversion of hydrocarbons, for example, catalytic cracking of high boiling hydrocarbons to low boiling gasoline products of high octane quality, it is found that when the regenerator is situated above the reactor the stripping efficiency is lower than is desired. In such systems usually the stripper is positioned centrally within the lower reactor, and thereby spent catalyst flows into the stripper and after suitable stripping treatment it is conveyed upwardly in a riser also situated in a concentric position within the stripper to the higher regenerator. The entrance of spent catalyst into the stripper is usually effected by means of baffle slots and as a consequence the spent catalyst tends to flow downwardly along the inner wall of the stripper. This phenomenon has a serious adverse effect on stripping efficiency by reason that spent catalyst is not distributed uniformly over the cross-sectional area of the stripping zone for intimate contact with the unflowing gasiform stripping medium. Further, by reason of the position of the riser in the stripper there is a tendency for the stripping agent to bypass the stripping zone and flow into the riser, thus lowering stripping efficiency. These defects have been noticed in commercial operations and, therefore, after extensive investigation it is proposed by means of this invention to overcome substantially the problems inherent in such systems.

In accordance with this invention an apparatus is provided which comprises a large contacting means adapted to contain finely divided solid material, an elongated contacting means of reduced cross-sectional area and situated within said contacting means and adapted to receive solid material therefrom for downward flow therein, elongated upflow means of reduced cross-sectional area situated within said elongated contacting means and having its lower end within the bottom part thereof and adapted to receive solid material from said elongated contacting means for upward flow therein, baffle means positioned within the zone provided between the elongated contacting means and the elongated upflow means whereby the solid material flows obliquely downwardly from the elongated contacting means to the end of said elongated upflow means, and said baffle means is provided with openings for the upward passage of gasiform material to be intimately contacted with a downflowing solid material on said baffle means and means for introducing gasiform material into said elongated contacting means for upward passage through the openings in said baffle means.

The improvement of the present invention is particularly applicable to a system wherein a regenerator or regeneration means is situated above a reactor or reaction means, the stripping means or vessel is positioned centrally within said reaction means thereby providing an annular zone between the reaction means and the stripping means, the spent catalyst passes from the annular reaction zone to the stripping means via louvers or baffle slots associated with said stripping means and following the stripping treatment of the spent catalyst it is conveyed upwardly in an upflow means or riser which is positioned concentrically within the stripping means. In this type of a system there is a tendency for the spent catalyst flowing downwardly in the stripper to collect along the walls thereof with consequent reduction in stripping efficiency. Further, the gasiform stripping agent such as, for example, steam is introduced into the annular zone formed between the upflow means or riser and stripping means, and in this case there is a tendency for the stripping gas to pass upwardly along with the stripped catalyst into the riser with consequent reduction in stripping efficiency. By means of the present invention baffle means are provided within the annular zone formed between the stripping means and the riser such that the spent catalyst flows obliquely downwardly over said baffle means towards the end or inlet of said riser means. The baffle means are positioned at an angle of greater than the angle repose of the subdivided solid material. Consequently, there is little or no tendency for the solid material to remain deposited or collected on said baffle means. With regard to the gasiform stripping agent, the baffle means provides for the oblique downward flow of solids toward the inlet of the riser and the stripping agent is introduced below the baffle means for upward passage through a plurality of openings contained therein. The openings in the baffle means can be of any suitable shape. However, it is preferred that circular openings be employed of such number that the openings cover about one-quarter to about three-quarters of the path of travel of the solid material passing downwardly over the baffle means. In the preferred practice the openings should occupy about 30 to 50% of the surface over which the finely divided solids flow downwardly. The number of openings and the size thereof are selected on the basis of providing a pressure drop of about 0.25 to about 1.5 p. s. i. A higher pressure drop may tend to divert the steam from passing through the openings in the baffle for upward passage through the opening between the end of the baffle and the riser and thereby bypass the normal path by which improved stripping efficiency is obtained. Further, a lower pressure drop than specified may result in an undue amount of catalyst flowing through the openings in said baffle thereby lowering stripping efficiency. Similarly, the area of the baffle which is perforated for upward passage of the stripping gas is not greater than specified hereinabove by reason that there is a tendency for catalyst or solids to pass downwardly through the openings resulting in reduced stripping efficiency. The baffle means to be employed for the purpose of this invention is preferably a frusto circular conically shaped baffle. In practice the system in which the present invention is utilized may contain one or more of such baffles, and arranged to provide a flow of catalyst in a zigzag fashion commencing from one side of the stripper zone, such as the stripper wall, and terminating at the other side of the zone, such as the riser, and then in the subsequent stage the downflowing catalyst passes from the riser to the stripper wall and this sequence is repeated to the end of the riser at the bottom of the stripper where the catalyst is passed from the stripper wall to the riser outlet. At the point where stripping gas is introduced into the stripping zone is the greatest danger of stripping gas bypassing the stripper and passing upwardly through the riser. To prevent this from happening, it is preferred to employ a skirt means or baffle means embodied as a depending circular section from the lowermost end of each baffle section. In this manner, catalyst flowing downwardly towards the riser inlet forms a column of catalyst within the annular zone between the end of the baffle or the depending circular section and the riser, and this descending column of catalyst serves to prevent stripping gas from passing upwardly therein. In addition, any tendency of the stripping gas to flow towards the riser inlet is baffled by means of the depending skirt and directed towards the openings or perforations in the baffle. In connection with the baffles which may be situated above the lowermost one, in the preferred practices of the invention these baffles also contain a depending skirt from the lowermost end thereof. As in the case explained above, the depending skirt or baffle serves to create a downflowing column of catalyst which prevents upflowing stripping gas from bypassing the perforations in the baffle.

In the practice of the present invention the zone in which the subdivided material is contacted with gasiform material can contain one or more baffle means of the type described hereinabove. In the case where the subdivided solid material is introduced along the inner wall of the stripping zone then it is preferred that an odd number of baffle means be employed within the stripping zone. For example, there can be one, three, five, etc., baffle means positioned in the manner described hereinabove. On the other hand, where a subdivided solid material is introduced into the stripping zone at a point near the central part thereof then an even number or a single baffle means can be employed for the purpose of this invention. In the case of the even number of baffles the catalyst is passed from the riser to the inner wall of the stripper and then it is passed from the inner wall of the stripper to the riser inlet.

The baffle means of the present invention can be employed in any system where it is desired to contact intimately subdivided solid material with gasiform material. In this connection the baffle means of the present invention has particular utility in regard to a system where it is desired to remove volatile hydrocarbons from a finely divided catalytic material in what is commonly referred to as a stripping zone. This stripping zone can be part of a system in which hydrocarbons are converted to the desired reaction products. The various processes in which the invention can be utilized are, for example, hydroforming, catalytic cracking, hydrogenation, desulfurization, dehydrogenation, etc. In general, a suitable hydrocarbon reactant is contacted with a mass of subdivided contact material under suitable conversion conditions for the production of the desired reaction product. As previously indicated, this invention has particular utility with regard to a type of system in which one of the contacting means, whether it be reactor or regenerator, is situated above the other contacting means, either the reactor or the regenerator. In this type of sytem the stripping zone should be situated to have the riser positioned concentrically therein and thereby the catalyst flows downwardly in the stripper and thence upwardly in the riser. It has been found in commercial practice that the baffle means of the present invention effects a substantial increase in stripping efficiency in a system of the type where the regenerator is situated above the reactor and the reactor contains the riser within the stripper and the stripper is positioned centrally within the reactor.

As an illustrative embodiment of this invention, reference will be had to the accompanying drawing which forms a part of this specification.

In the drawing vessel 5 is a vertical cylindrical reactor which is in vertical alignment with a second vertical cylindrical vessel 6 commonly referred to as the regenerator. In this apparatus the regenerator is of enlarged cross-sectional area relative to the reactor by virtue that it is adapted to contain a larger quantity of finely divided solid material than the reactor. The catalyst bed 8 in the reactor 5 proper is in the form of annular shape by reason that it exists in the space provided by the vertical walls of reactor 5 and a vertical cylindrical stripper 9 which is positioned centrally therein. The finely divided catalytic material in the reaction zone is in a dense fluidized condition having a level 10. Oil feed material, such as gas oil, is fed into the reaction zone by means of lines 12 and 13 which are located in diametrically opposite positions on the bottom part of reactor 5. As a result of converting the gas oil to a gasoline product of high octane quality, the catalytic material, which in this example is silica-alumina, becomes contaminated with carbonaceous material, thus requiring regeneration treatment for the maintenance of the desired catalytic activity in the reaction zone. Consequently, spent catalyst is passed through louvers 14 and 15 of the stripper 9 and thereafter it is treated in accordance with the improved means of the present invention. The reaction product resulting from the conversion of gas oil to gasoline product passes from catalyst bed 8 to a cyclone separator 18 wherein entrained catalyst fines are separated and returned to the catalyst bed 8 by means of dipleg 20. The reaction product of substantially reduced catalyst fines content is discharged from the system by means of line 22.

The spent catalyst in stripper 9 is present therein in the form of a dense fluidized mass having a level 25. The density of the dense phase of catalyst in the stripper is maintained at about 30 pounds per cubic foot. The spent catalyst will contain adsorbed and occluded volatile hydrocarbon material which should be removed from the catalytic material prior to subjecting same to a regeneration treatment. Accordingly, by means of the present invention, the spent catalyst flows downwardly in stripper 9 and passes through a zone containing baffles 28, 29 and 30, as shown in the drawing. Each of the baffles is in the form of a frusto circular conically shaped member and, of the three baffles shown, baffles 28 and 30 are in an inverted position. The size of the stripper provides a catalyst linear velocity of 0.33 feet per second. The mass velocity of the catalyst in the free area of the stripper is 5000 pounds per square foot per minute. In order to provide effective stripping of the catalyst, each of baffles 28, 29 and 30 is provided with a plurality of holes having a diameter of ¾ of an inch. In each baffle there are approximately 2700 holes of the dimension given above and the perforated area of the baffle constitutes about one-third of the width of the baffle. Each baffle is positioned at an angle of about 45° from the vertical wall of the stripper 9. The holes in the baffle provide for enhanced stripping efficiency by reason that as the spent catalyst descends obliquely downwardly over the surface of the baffle gasiform stripping agent, such as, for example, steam, flows upwardly through the openings in the baffle and mingles with the spent catalyst in a manner providing for a uniform contact of gas and spent catalyst. The inverted conically shaped baffle 28 permits the spent catalyst to flow downwardly in an oblique manner towards a riser 32 which is positioned within stripper 9 in a central or concentric relation therewith. The spent catalyst flowing downwardly over baffle 28 passes to an annular zone formed between riser 32 and a skirt 33 which depends vertically from the end of baffle 28. Following the initial treatment of the spent catalyst within stripper 9 on baffle 28 the catalyst again flows downwardly in an oblique fashion over baffle 29 which is of conical shape and positioned vertically. The upper end of baffle 29 is connected or sealed with riser 32; whereas in the case of baffle 28 the inverted base of the cone is connected to stripper 9. As a consequence the stripped catalyst flows as a tortuous path over the baffles in the manner indicated. Baffle 29 is similarly perforated as described in connection with baffle 28. Further, the pressure drop across each baffle, namely, baffles 28, 29, and 30, is one pound per square inch. The gasiform stripping agent passes through the openings contained in baffle 29 and thereby provides uniform contact between the spent catalyst and the upflowing stripping material. Following, the catalyst flows from baffle 29 and passes into an annular zone formed by means of skirt 35 and the wall of stripper 9. The free area of the annular zone formed between stripper 9 and skirt 35 is about 8.2 square feet. The spent catalyst flows through the annular zone formed between stripper 9 and skirt 35 of baffle 29 to baffle 30 which is positioned similarly as baffle 28. Baffle 30 is an inverted conical section which has its base sealed to or connected with the wall of stripper 9. Baffle 30 is perforated similarly as in the case of baffles 28 and 29. The spent catalyst passes from baffle 30 wherein it is additionally contacted with gasiform stripping agent and descends downwardly through an annular zone formed between skirt 36 and the combination of riser 32 with plug valve 38. Skirt 36 is a vertical cylindrical section which is of sufficient height to shield stripping gas being introduced through lines 40 and 41 from the opening in riser 32. The shielding action of skirt 36 is an important feature of this invention by reason that it prevents stripping gas from passing through the annular zone formed between it and riser 32 and thereby flowing upwardly through riser 32 along with stripped catalyst. It is to be noted from the arrangement of the baffles in stripper 9 that spent catalyst cannot flow downwardly along the walls of the stripper and thereby lower stripping efficiency, and, in addition, the spent catalyst is directed to the inlet of riser 32 thereby preventing stagnant portions from forming within the stripper zone. Further, the arrangement of the conical baffles 28, 29 and 30 provides for three successive concurrent stripping actions which result in substantially enhanced stripping efficiency.

The stripped catalyst passes upwardly through riser 32 by means of carrying gas being supplied from line 43 and passing into the riser by means of adjustable plug valve 38. The spent catalyst is discharged from riser 32 and enters the regenerator 6 wherein it is treated for the removal of carbonaceous material. For this purpose air is supplied into the bottom part of the regenerator 6 by means of lines 45 and 46. The air burns the carbonaceous deposit on the catalyst at a temperature of about 1125° F. The catalyst in regenerator 6 is maintained as a dense fluidized mass 50 having a level 51. The flue gas resulting from the combustion of carbonaceous material is first passed into a cyclone separator 53 wherein entrained catalyst fines are separated and returned to the catalyst bed 50 by means of dipleg 55. The flue gas of substantially reduced fines content is discharged from the system by means of line 56. The regenerated catalyst of substantially reduced carbonaceous content is withdrawn from the bottom of bed 50 and it flows downwardly through standpipe 60. The rate of catalyst withdrawn from the regenerator is regulated by means of a plug valve 61 which is positioned at the bottom of standpipe 60 and serves to regulate the size of the opening through which regenerated catalyst is flowing into the reaction zone.

In the operation of the system described above the following conditions were employed:

| | |
|---|---:|
| Reactor temperature, °F | 900 |
| Reactor pressure, p. s. i. g | 16.0 |
| Gas oil rate, B. P. D | 17,750 |
| Gas oil gravity, °API | 28.6 |
| Weight space vel., $W_o$/Hr./$W_c$ | 1.40 |
| c/o, wt. basis | 7.7 |
| Reactor bed density, lb./cu. ft | 35.0 |
| Catalyst | silica-alumina |
| Reactor diameter, feet | 23.5 |
| Reactor height, feet | 40.0 |
| Stripper diameter, feet | 11.0 |
| Stripper length, feet | 25.0 |
| Riser (32) diameter, inches | 42.0 |
| Skirt (36) height, feet | 2.0 |
| Skirts (33 or 35) height, inches | 6.0 |
| Distance of riser end from reactor bottom, feet | 3.0 |
| Distance from baffle (28) to riser (32), inches | 9.0 |
| Distance from baffle (29) to stripper wall, inches | 6.0 |
| Distance from baffle (30) to valve (38), inches | 18.0 |
| Stripper bed density, lb./cu. ft | 30.0 |
| Catalyst mass vel. in stripper, lb./sq. ft./min | 5000 |
| Catalyst linear vel. in stripper, ft./sec | 2.78 |
| Stripping steam, lb./1000 lb. of cat | 5 |
| Vel. of stripping steam thru baffles, ft./sec | 25 |
| Regenerator temperature, °F | 1125 |
| Regenerator pressure, p. s. i. g | 8.4 |
| Catalyst bed density, lb./cu. ft | 30.0 |

Having thus provided a written description of the present invention along with a specific example thereof it should be understood that no undue limitations or restrictions are to be imposed by reason thereof.

I claim:

1. A unitary vessel comprising in combination a lower reaction chamber and an upper regeneration chamber, a cylindrical chamber extending upwardly from the bottom of said reaction chamber open at its upper end, a first open end conduit extending from the lower portion of said cylindrical chamber upwardly into said regeneration chamber, a second open end conduit extending from the lower portion of said regeneration chamber to the lower portion of said reaction chamber external of said cylindrical chamber, said first conduit forming an annular chamber with the walls of said cylindrical chamber, said annular chamber provided with a plurality of alternately staggered downwardly sloping perforated frusto-conical baffle members with the lowermost baffle sloping downwardly towards said first conduit and having attached to the lower end thereof a non-perforated cylindrical skirt which extends below the open end inlet of said first conduit to provide an annular passageway between said skirt and said first conduit, a vertically movable hollow stem plug valve concentrically positioned within said skirt and aligned with the open end inlet of said first conduit, means for introducing a gaseous material to the lower portion of said annular chamber and means for introducing a vaporous material to said hollow stem plug valve for flow upwardly through said first conduit.

2. A vessel comprising in combination a lower reaction chamber and an upper regeneration chamber, said regeneration chamber being of larger diameter than said reaction chamber and separated therefrom by a common baffle member, said reaction chamber containing in the lower portion thereof a coaxially positioned elongated cylindrical chamber extending upwardly from the bottom of said reaction chamber, a first open end conduit extending from the lower portion of said reaction chamber external to said cylindrical chamber upwardly into said regeneration chamber, a second open end conduit extending from within the lower portion of said cylindrical chamber substantially vertically upwardly into said regeneration chamber, a vertically movable plug valve coaxially aligned with the bottom of said second open end conduit, said second conduit forming an annular chamber with the walls of said cylindrical chamber, said annular chamber provided with downwardly sloping alternately staggered perforated baffle members with the lowermost member sloping towards the open end inlet of said second conduit, said lowermost baffle member having a non-perforated skirt attached to the lower edge thereof which extends below the bottom of the inlet to said second conduit to form an annular space between said skirt and said movable plug valve, and means for introducing a gaseous material to the lower portion of said annular chamber.

3. The apparatus of claim 2 wherein each of said baffle members above said lowermost baffle have a depending solid skirt member attached to the lower edge thereof to provide an annular passageway between the skirt and the walls of said annular chamber.

4. A vessel comprising in combination an upper first chamber and a lower second chamber, said chambers separated by a common dome-shaped baffle member, an elongated cylindrical chamber extending upwardly from the bottom of said second chamber forming a first annular chamber with the walls of said second chamber, a first conduit member open at its extreme ends extending from within the lower portion of said cylindrical chamber substantially vertically upward into the bottom of said first chamber, said first conduit forming a second annular chamber with the walls of said cylindrical chamber, a second conduit open at its extreme ends extending from the lower portion of said first chamber into the lower portion of said first annular chamber, said second annular chamber adapted to receive finely divided solid particles in the upper portion thereof from said first annular chamber, said second annular chamber provided with a plurality of alternately staggered downwardly sloping annular baffle members to provide a tortuous path for flow of finely divided solids downwardly through said second annular chamber, said baffle members perforated to permit flow of gaseous materials upwardly through the cross-sectional area of said second annular chamber and through said baffles, the lowermost baffle having a solid skirt member depending downwardly from the lower edge thereof to below the open end of said first conduit member and a vertically movable hollow stem plug valve aligned with the bottom of said first open end conduit for controlling the flow of finely divided contact material upwardly through said first conduit.

5. An apparatus comprising in combination a first vessel, a cylindrical chamber of smaller diameter than said first vessel open at its upper end extending upwardly from the bottom of said first vessel, a first conduit coaxially positioned within and extending from the lower portion of said cylindrical chamber upwardly therethrough to a second vessel positioned above said first vessel, said first conduit forming an annular space with the walls of said cylindrical chamber, alternately staggered downwardly sloping perforated frusto-conical baffle members positioned within said annular space, the lowermost baffle member sloping downwardly towards the bottom of said conduit and provided with an impervious skirt member extending downwardly from the lower edge thereof to a point below the bottom of said first conduit, said first conduit being open at its extreme lower end and flanged outwardly in the lower portion thereof to provide an inlet to said conduit, a vertically movable hollow stem plug valve aligned with said flanged inlet and providing an annular space with said skirt member, conduit means for introducing a stripping gas to said annular space beneath said lowest baffle member, conduit means for removing stripping gas from the upper portion of said first vessel and a second conduit open at its extreme end extending substantially vertically from the lower portion of said second vessel to the lower portion of said first vessel external of said cylindrical chamber.

References Cited in the file of this patent

UNITED STATES PATENTS

| | | |
|---|---|---|
| 2,439,582 | Scheineman | Apr. 13, 1948 |
| 2,440,620 | Taff | Apr. 27, 1948 |
| 2,457,232 | Hengstebeck | Dec. 28, 1948 |
| 2,459,824 | Leffer | Jan. 25, 1949 |
| 2,519,150 | Ostergaard | Aug. 15, 1950 |
| 2,525,925 | Marshall | Oct. 17, 1950 |
| 2,685,498 | Dickinson | Aug. 3, 1954 |